United States Patent
Haeff et al.

[11] 3,760,417
[45] Sept. 18, 1973

[54] SYNCHRONIZED PULSE JAMMER AND DECOY

[75] Inventors: Andrew V. Haeff, Washington, D.C.; Franklin H. Harris, Accokeek, Md.

[73] Assignee: The United States of America as represented by the Secretary of the Navy, Washington, D.C.

[22] Filed: Jan. 15, 1946

[21] Appl. No.: 641,363

[52] U.S. Cl. ............................................. 343/18 E
[51] Int. Cl. ............................................. H04k 3/00
[58] Field of Search ................................. 343/18 E

[56] References Cited
UNITED STATES PATENTS

| | | | |
|---|---|---|---|
| 2,978,699 | 4/1961 | Dodington | 343/18 E |
| 3,113,268 | 12/1963 | Horak | 343/18 E X |
| 3,579,238 | 5/1971 | Haeff et al. | 343/18 E |
| 3,624,652 | 11/1971 | Haeff | 343/18 E |
| 2,201,978 | 5/1940 | Bedford | 250/36 |
| 2,433,667 | 12/1947 | Hollingsworth | 343/13 |
| 2,467,208 | 4/1949 | Hahn | 343/11 |
| 2,440,253 | 4/1948 | Doddington | 343/18 X |
| 2,516,356 | 7/1950 | Tull et al. | 343/7.3 |
| 2,671,897 | 7/1945 | Woodbury | 343/6.5 |
| 2,706,773 | 4/1955 | Doddington | 343/18 X |
| 2,403,011 | 7/1946 | McClain, Jr. | 250/20.36 |
| 2,272,070 | 2/1942 | Reeves | 250/27 TR UX |
| 2,413,932 | 1/1947 | Sziklai | 250/27 TR UX |
| 2,402,916 | 6/1946 | Schroeder | 250/36 |
| 2,402,917 | 6/1946 | Miller | 250/36 |

Primary Examiner—T. H. Tubbesing
Attorney—J. A. O'Connell and R. C. Reed

EXEMPLARY CLAIM

1. A device for rendering enemy radio pulse echo location equipment ineffective comprising radio receiver means for receiving said enemy pulses, interference transmitting means, and delay pulser means connected between said receiving means and said transmitting means and triggered by said received pulses to pulse operate said transmitting means a predetermined time after receipt of an enemy pulse so that the transmitted interference pulse overlaps in time the reception of the next succeeding pulse signal from said pulse echo location equipment, said pulser means including control means responsive to changes which may occur in the repetition rate of said received pulses to automatically readjust said predetermined time.

5 Claims, 5 Drawing Figures

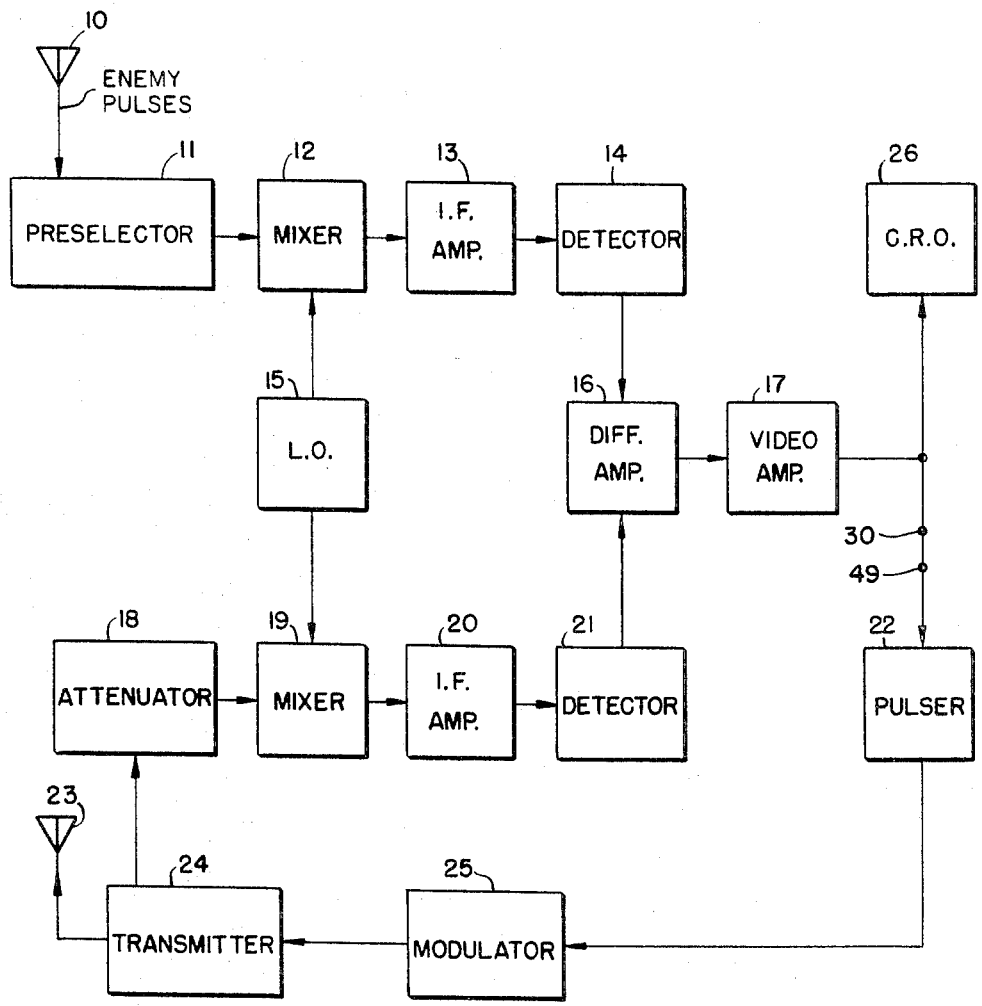

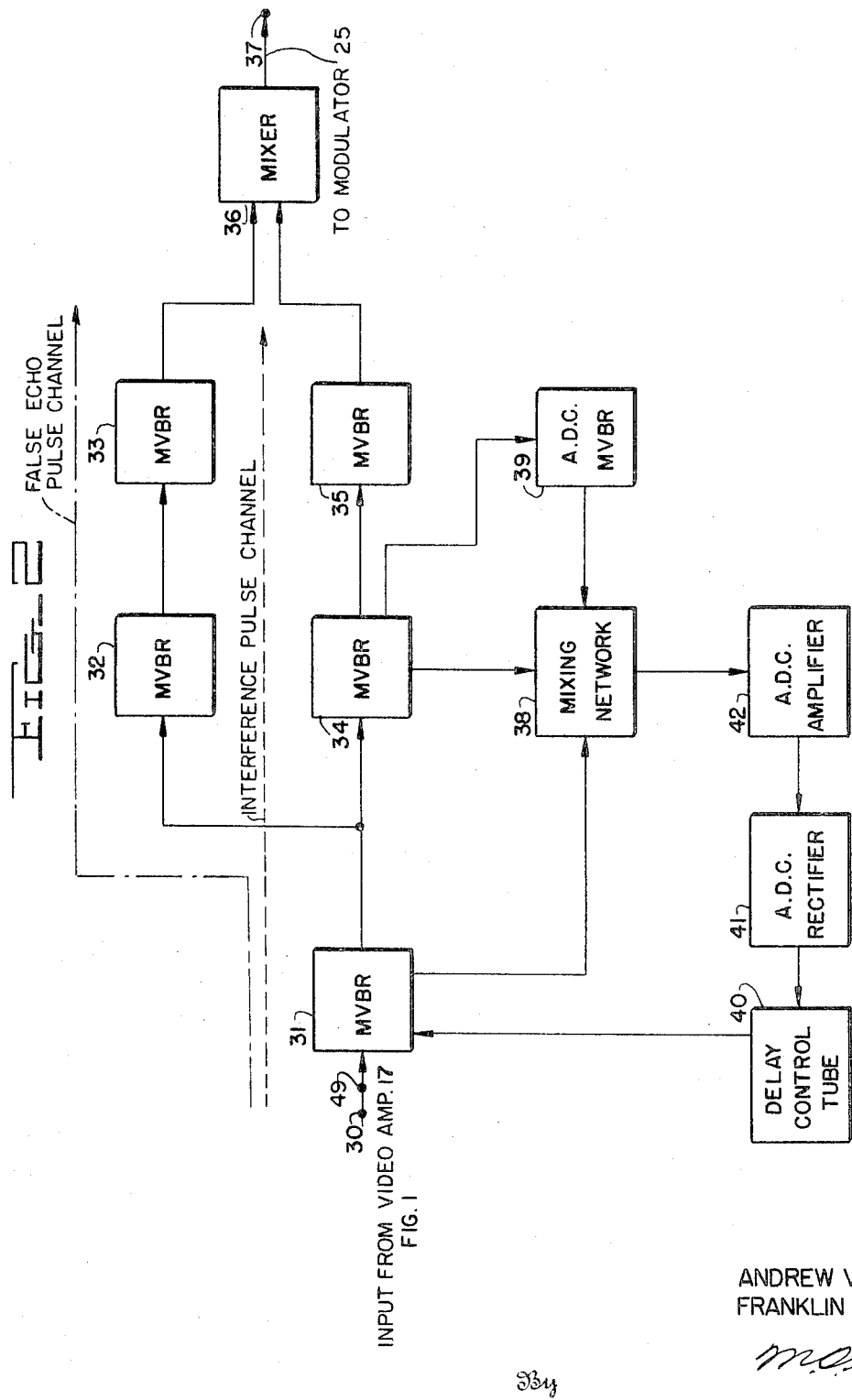

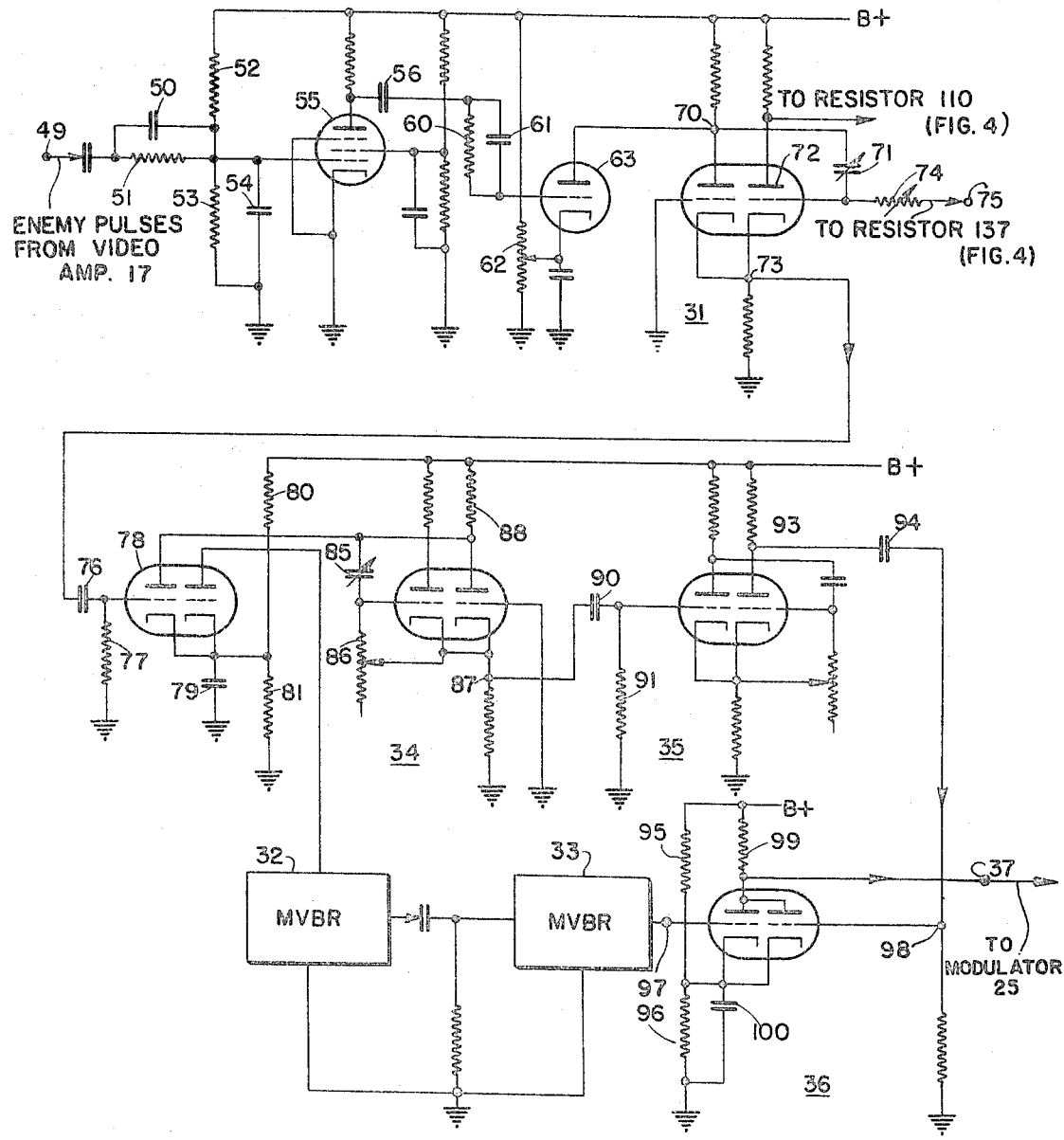

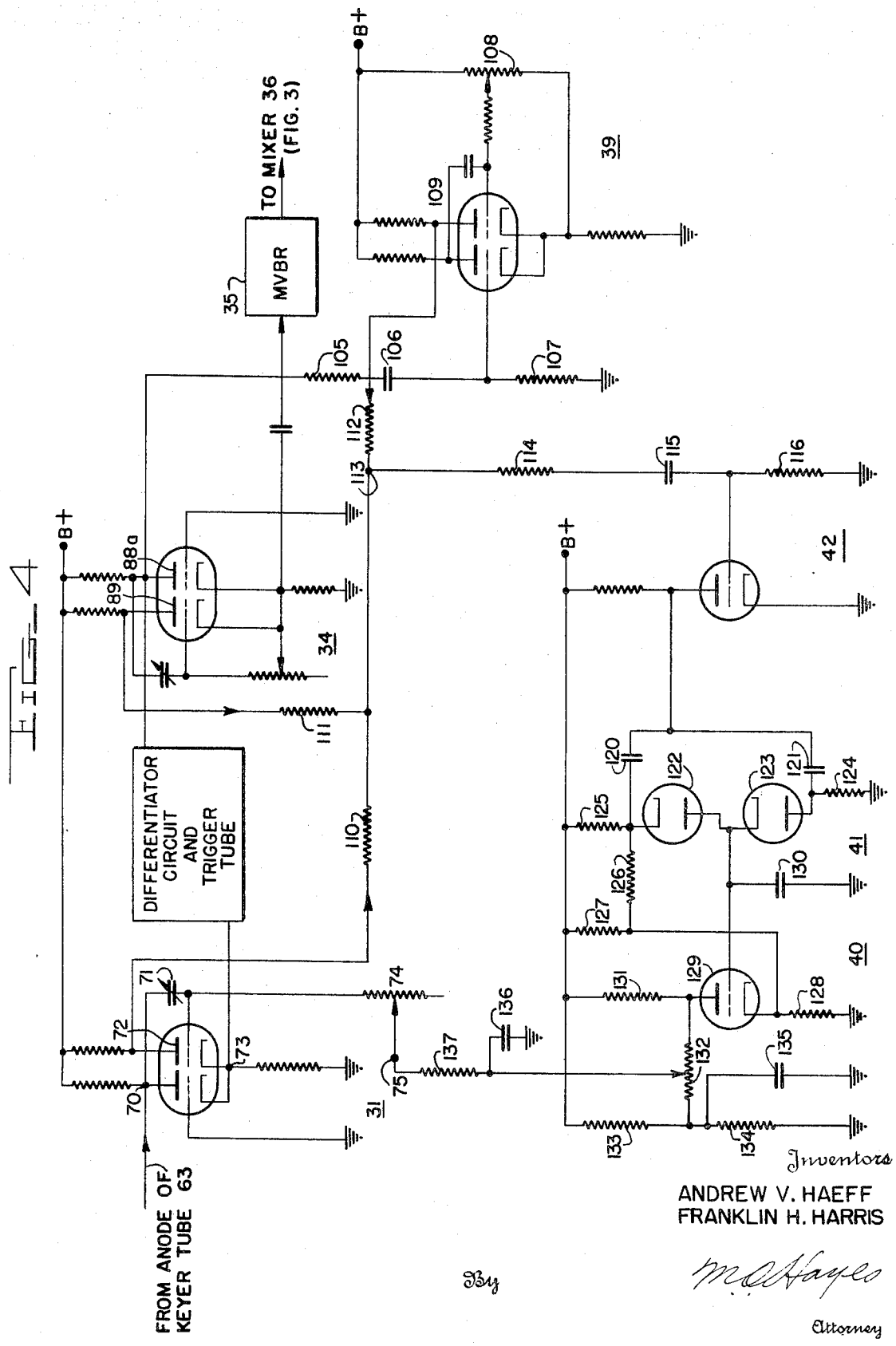

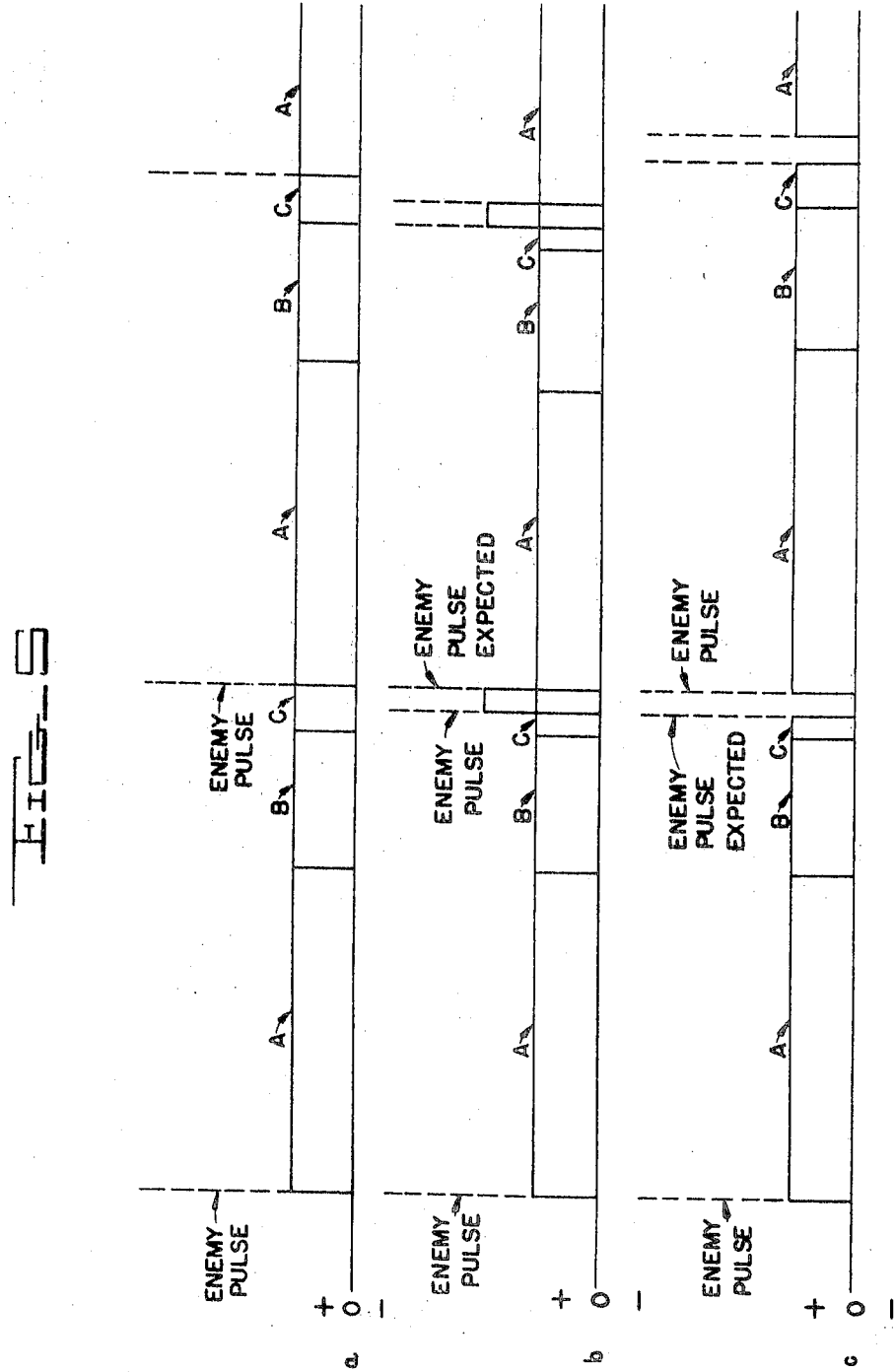

SYNCHRONIZED PULSE JAMMER AND DECOY

This invention relates to devices used to render enemy radio echo location equipment ineffective.

One of the important special applications of radio echo location equipment is its use for the control of gun fire. In such applications the equipment is designed to determine the range and bearing of target objects with greater accuracy than is normally possible with radio echo location equipment intended for detection purposes only.

Efforts to render enemy radio echo location equipment ineffective commonly consist of transmitting a suitably modulated interfering signal which either saturates one or more stages of the radio echo location receiver or renders the visual presentation unintelligible. For the latter purpose modulation with a form of random signal containing a broad spectrum of frequencies up to several megacycles, known as noise modulation, has been found most effective.

The interfering signal must be tuned to or approximately to the carrier frequency of the enemy echo locating equipment. To be effective, the interfering signal must be many decibels larger than the echo signal at the enemy locating receiver. The interfering transmitter should be capable of being modulated with a signal containing relatively high frequencies. These three requisites create the need for an interfering transmitter, tunable over a broad range, capable of modulation up to several megacycles, and capable of delivering a large amount of power spread over its frequency spectrum. If the interfering signal is to be continuous, the design of such a transmitter involves the use of special power tubes which are not readily available.

An alternative method is to transmit the interfering signal in suitably timed pulses. Such a method, described in greater detail in the copending application of Andrew V. Haeff, entitled: Pulse Generation System Ser. No. 641,549, filed Jan. 16, 1946, now U.S. Pat. No. 3,624,652, permits substantial peak power output from tubes with low average power capacities. Its use is based on the premise that for the protection of individual targets from enemy fire control radio echo location equipments it is sufficient to generate interfering signals only in the immediate proximity of the echo signal.

A further advantage of this alternative method is that equipment designed to transmit pulsed interfering signals can be used with suitable auxillary circuits to simulate deceptive echo signals.

An object of this invention is to provide a means for and a method of timing interfering signal pulses so that said interfering signal pulses will obscure echo signals.

Another object of this invention is to provide a means for and a method of maintaining the interfering signal pulses and the echo signals in synchronism, regardless of changes in the pulse repetition frequency of the enemy radio echo location equipment.

A further object of this invention is to provide a means for and a method of pulsing an interfering transmitter in such a manner as to cause false echo pulses to appear on the screens of enemy radio echo location equipments.

Other objects and features of the present invention will become apparent upon a careful consideration of the following detailed description when taken together with the accompanying drawings, in which:

FIG. 1 is a block diagram of the interference transmitting system of which this invention is a part;

FIG. 2 is a block diagram of the basic circuits used in timing the pulses and the circuits used in maintaining synchronization between the interfering pulsed signals and the enemy signals;

FIG. 3 is a diagram, partly schematic, of the basic circuits used in timing the pulses;

FIG. 4 is a diagram, partly schematic, of the circuits used in syncronization; and FIG. 5 shows a series of wave shapes useful in the explanation of the synchronizing circuits.

The interference transmitting system of which the present invention is a part, and which is described in detail in the Haeff application supra, receives radio pulses of enemy origin and utilizes them to actuate pulses which in turn actuate a transmitter after a suitable interval. In order that the output of the transmitter will not reactuate the system, means are provided whereby a portion of the transmitter output neutralizes the transmitter signal received by the receiver antenna.

Specifically, and in accordance with the arrangement shown in FIG. 1, the pulses transmitted by the enemy radio are received in antenna 10, passed through a preselector 11, converted to an intermediate frequency by beating with the output of local oscillator 15 in mixer 12, further amplified in intermediate frequency amplifier section 13, demodulated in detector 14, further amplified in differential amplifier 16 and video amplifier 17, the output of which is applied to cathode ray indicator tube 26 and to pulser circuits 22.

For each trigger pulse received from the video amplifier, the pulser applies an actuating pulse to modulator 25 after a suitable delay. Modulator 25 in turn actuates transmitter 24, the output of which is radiated through a separate antenna 23. The delay occasioned by the pulser is such that the actuating pulse from the pulser overlaps the next succeeding pulse received from the enemy, or so that a suitably placed false echo pulse is transmitted.

The cathode ray indicator tube and its associated circuits are used in adjusting the pulser to the enemy pulse repetition rate.

A small portion of the output of transmitter 24 is fed through attenuator 18 to mixer 19 where it is converted to the intermediate frequency by beating with the output of local oscillator 15. This signal is amplified in intermediate frequency amplifier section 20, demodulated in detector 21 and applied to differential amplifier 16. Differential amplifier 16 is arranged, in a manner described in the Haeff application supra, so that the signal originating in leakage radiation coupling between the receiving and transmitting antennas and applied from detector 14 is neutralized by the signal applied from detector 21. Accordingly, when the channel containing detector 21 is operative, only the pulses received from the enemy radar and a small residue of the interference pulses are passed to pulser 22 and cathode ray tube 26.

The interrelation of the pertinent circuits contained in the pulser is shown in FIG. 2. The timing and duration of the interference pulse is determined in the channel comprising multivibrators 31, 34, and 35. Multivibrator 31 is a one-shot multivibrator the period of which is controlled both mechanically and by the voltage applied from the automatic delay control 40. Multivibrators 34 and 35 are also one-shot multivibrators the periods of which may be adjusted. Multivibrator 31 is triggered by the pulse received from the enemy, through input 30, and the trailing edge of its output triggers multivibrator 34. The trailing edge of the output of multivibrator 34 in turn triggers multivibrator 35. The combined periods of multivibrators 31 and 34 determine the time elapsing between the reception of the first pulse from the enemy and the start of the interference pulse which is to obscure the echo from the next succeeding pulse from the enemy. Multivibrator 35 determines the duration of the interference pulse.

The timing and duration of the false echo pulse is determined in the channel comprising multivibrators 31, 32, and 33, the latter two of which also have adjustable periods, the combined periods of multivibrators 31 and 32 determine the time elapsing between the reception of a pulse from the enemy and the start of the transmission of a false echo pulse. Multivibrator 33 determines the duration of the false echo pulse.

The outputs from the interference pulse channel and the false echo pulse channel are combined in mixer circuit 36 the output of which actuates the modulator.

Multivibrator 39, which is another one-shot multivibrator with an adjustable period, is used in the automatic delay control circuits to be described in what follows. This multivibrator is also triggered by the trailing edge of the output from multivibrator 34. The total of the periods of multivibrators 31, 34, and 39 is made equal to the interval between pulses received from the enemy.

The timing in the system as described in the foregoing paragraphs would be adequate if no changes occurred in the pulse repetition rate of the enemy radio echo location equipment. For the possibility that such changes will occur, it is desirable to provide means whereby the system automatically adjusts itself to such changes. The mixing network 38, automatic delay control amplifier 42, the automatic delay control rectifier 41 and the automatic delay control tube 40 perform this function. Positive pulses of equal amplitude are applied from multivibrators 31, 34, and 39 to mixing network 38. Since the combined periods of these three multivibrators are equal to the interval between enemy pulses at the initial pulse repetition frequency, the output of the mixing network is a steady direct current voltage as long as the enemy pulse repetition frequency remains constant. If, however, the enemy pulse repetition frequency is increased part of the output of multivibrator 39 will overlap the start of the positive pulse from multivibrator 31 and positive pulses will appear in the output of mixing network 38. Similarly, if the enemy pulse repetition rate is decreased, negative pulses will appear in the output of the mixing network. The automatic delay control rectifier 41 operates to convert these positive or negative pulses into steady signals which are applied to the grid of delay control tube 40.

The period of multivibrator 31 is determined in part by the potential to which the grid of its normally conducting tube is returned. This potential is determined by the delay control tube in such a way that the period of multivibrator 31 is decreased if positive pulses are applied to automatic delay control amplifier 42 and conversely is increased if negative pulses are applied to automatic delay control amplifier 42. This action tends to keep the system synchronized with the enemy pulse repetition rate.

For a more detailed disclosure of the basic timing circuits, reference is made now to FIG. 3. In this Figure the signal from the enemy radio echo location system is received from the receiver video amplifier 17 as a negative pulse at terminal 49. This pulse that is applied to polarity inverter tube 55 through an attenuator network comprising resistors 51 and 53 and capacitors 50 and 54. This attenuator network is designed to provide the same attenuation over a broad range of frequencies. A positive bias is maintained on the control grid of tube 55 by the voltage divider action of resistors 52 and 53 such that substantially only negative signals sufficient to bring the grid below the cathode potential will be reflected in the output.

The positive pulse output of polarity inverter tube 55 is coupled to the grid of a trigger tube 63 for multivibrator 31, through capacitor 56 and through resistor 60 and capacitor 61 in parallel. Resistor 60 and capacitor 61 offer a high impedance to low frequency components and are to prevent the trigger tube 63 from loading the preceeding stage on positive excursions of the grid of the former. The cathode bias of trigger tube 63, controlled by the position of the tap on potentiometer 62, determines its threshold sensitivity.

Trigger tube 63 and the normally off tube of multivibrator 31 have the same plate load resistor having their anodes connected together at terminal 70; consequently, when tube 63 is rendered conducting the potential at the plate of the normally off tube and at the grid of the normally on tube drops, starting the cycle. The period of multivibrator 31 is controlled by variable capacitor 71, variable resistor 74, and the positive potential which is applied at terminal 75. The former two circuit elements are used in the preliminary adjustment of the system; the latter potential is provided by the automatic delay control circuits to be described hereinafter in detail.

A negative pulse output from multivibrator 31 is obtained at the cathode 73 of the normally conducting tube and applied through a differentiator circuit comprising capacitor 76 and resistor 77 to the control grids of a double triode 78. The left half of double triode 78 serves as the trigger tube for multivibrator 34; the right half of this double triode serves as the trigger tube for multivibrator 32. The cathodes of the two trigger tubes are maintained at a positive bias sufficient to keep the tubes cut off in the absence of a grid signal; accordingly, the leading edge of the negative pulse from multivibrator 31, which the differentiator network converts into a short negative pulse has no effect on the trigger tubes, but the trailing edge of the pulse from multivibrator 31, which the differentiator network converts into a short positive pulse, renders them monentarily conducting.

The trigger triode for multivibrator 34 and the normally off tube of this multivibrator have a common plate load resistor 88; consequently, when the trigger tube is rendered conducting, the potential of the plate of the normally off multivibrator tube and the potential at the grid of the normally conducting tube are reduced, starting the cycle. The period of this multivibrator is determined by variable capacitor 85 and variable resistor 86 in accordance with well known multivibrator principles.

The negative pulse output from multivibrator 34 is obtained from the cathode terminal 87 of the two tubes and is applied through another differentiator circuit comprising capacitor 90 and resistor 91 to multivibrator 35. Multivibrator 35 is another cathode coupled one shot multivibrator similar to multivibrator 34 and is triggered by the short positive pulses created by the trailing edges from the output of multivibrator 34. A positive pulse output is obtained from plate 93 of the normally conducting tube of multivibrator 35 and applied to the mixer 36 through capacitor 94.

The operation of multivibrators 32 and 33 is substantially the same as that of multivibrators 34 and 35. Triggers tubes are used to actuate the two channels instead of direct coupling in order to isolate one channel from the other and to prevent interaction of the multivibrators.

The mixer 36 comprises a double triode both halves of which are biased below cut off by the positive potential maintained on both cathodes by the voltage divider consisting of resistors 95 and 96 and by capacitor 100. The plates of both triodes have a common load resistor 99.

The output from multivibrator 35 is applied to the grid 98 of the right hand triode of the mixer 36, and the output of multivibrator 33 is applied to the grid 97 of the left hand triode of the mixer 36. The combined output is obtained at the connected plates of the two triodes and comprises negative pulses which are applied to the modulator 25 (FIG. 1) through output terminal 37.

The synchronization circuits will now be described in connection with FIG. 4, and FIG. 5. Referring now to FIG. 4 a negative pulse output is taken from the plate 88a of the normally off tube of multivibrator 34 and applied through resistor 105 to a differentiator circuit comprising capacitor 106 and resistor 107. The output of the differentiator circuit is applied to the grid of the normally off tube of multivibrator 39, and accordingly, the short positive pulse occasioned by the trailing edge of the negative output pulse from multivibrator 34 triggers multivibrator 39. Multivibrator 39 is a one-shot cathode coupled multivibrator in which the period is determined, in accordance with well known multivibrator principles, by the position of the tap on potentiometer 108.

Positive pulse outputs are obtained from the plate 72 of the normally conducting tube of multivibrator 31, from the plate 89 of the normally conducting tube of multivibrator 34, and from the plate 109 of the normally conducting tube of multivibrator 39. These pulses are applied through isolating resistors 110, 111, and 112 respectively, to terminal 113. The outputs taken from plates 88a and 89, of multivibrator 34, have not been shown in FIG. 3 for purposes of simplicity.

Since the periods of multivibrators 31, 34, and 39 will have been adjusted initially so that their total is equal to the time elapsing between the reception of pulses from the enemy, the composite voltage appearing at terminal 113 is a substantially direct current voltage as shown in FIG. 5a as long as the enemy pulse repetition rate remains unchanged. This direct current voltage is established across capacitor 115 after which no signal is applied to the automatic delay control amplifier 42.

If, however, the enemy pulse repetition rate is increased, multivibrator 31 will be retriggered before the end of the pulse from multivibrator 39, and accordingly the voltage at terminal 113 is substantially as shown in FIG. 5b; i.e., a series of positive pulses rising over the direct current voltage mentioned in the previous paragraph. The positive pulses are occasioned by the overlap of the pulses from multivibrators 31 and 39.

Similarly, if the pulse repetition rate is decreased, the pulse from multivibrator 39 will have terminated before the next succeeding pulse from multivibrator 31 is started. Consequently, the voltage at terminal 113 will be substantially as shown in FIG. 5c; i.e., a series of negative pulses going below the direct current voltage.

These positive or negative pulses are applied to the grid of the vacuum tube in automatic delay control amplifier 42 where they are amplified, inverted in phase, and applied to the automatic delay control rectifier diodes 122 and 123 through capacitors 120 and 121 respectively.

In the absence of a signal from the automatic delay control amplifier, the plate of diode 123 is maintained at zero potential by connection to ground through resistor 124. The cathode of diode 122 is maintained at a potential slightly above the potential of the cathode of the delay control tube 129 by connection through resistor 126 to this cathode and through resistor 125 to the positive side of the power supply. The plate of diode 122 and the cathode of diode 123 are connected to the grid of delay control tube 129 and to one terminal of capacitor 130. The other terminal of capacitor 130 is connected to ground.

The potential at the grid of delay control tube is that provided by the charge on capacitor 130 which is in turn determined by the positive or negative pulses applied through diodes 123 and 122 respectively. The circuits provide no leakage path for capacitor 130; consequently whatever potential is established for the grid of delay control tube 129 remains until such time as it is changed by subsequent positive or negative pulses or until it leaks off over a substantial period of time without the benefit of a circuit path. As the grid potential of tube 129 is increased, the cathode potential is increased also by virtue of cathode resistor 128. As the cathode potential of tube 129 increases, the cathode potential of diode 122 also increases precluding discharge of capacitor 130 through diode 122.

If the enemy pulse repetition rate is decreased, negative pulses applied to automatic delay control amplifier 42 are amplified and inverted in this amplifier, and the resulting positive pulses are passed through capacitor 121 and diode 123 to increase the charge on capacitor 130 and thus the potential on the grid of tube 129. When the potential on the grid of delay control tube 129 is increased, the period of multivibrator 31 is increased in a manner to be described. Consequently, the total of the periods of multivibrators 31, 34, and 39 increases and continues to increase as long as positive pulses are adding to the charge on capacitor 130. These positive pulses continue until the sum of the periods of the three multivibrators is again equal to the time elapsing between pulse signals received from the enemy at the new repetition rate.

Similarly, if the enemy pulse repetition rate is increased, positive pulses are applied to the automatic delay control amplifier 42 which in turn applies amplified negative pulses through capacitor 120 and diode 122 to capacitor 130. As the charge on capacitor 130 and thus the potential at the grid of delay control tube 129 is reduced, the period of multivibrator 31 is reduced until the system is again synchronized with the increased enemy pulse repetition rate.

The delay control tube 129 has resistor 131 in its plate circuit across which the controlling voltage is developed. A positive bias is maintained on its cathode by the voltage divider action of cathode resistor 128 and resistor 127. The positive potential of the cathode is varied by cathode follower action in such a way as to provide a suitable positive potential on the cathode of diode 122.

When the system is adjusted initially, the tap on potentiometer 132 is placed in the extreme left position. Since the resistance of potentiometer 132 is very large, the voltage applied to this tap is essentially that provided by the voltage divider comprising resistors 133 and 134. The initial period of multivibrator 31 is determined by this fixed voltage to which the grid of the normally on tube is returned and by the time constant for the grid capacitor. This time constant is adjusted coarsely by capacitor 71 and finely by variable resistor 74. After the initial adjustment has been made, the automatic delay control circuits are made operative by moving the tap on potentiometer 132 from the extreme left to the extreme right position, returning the grid of the normally conducting tube of multivibrator 31 to the potential of the plate of delay control tube. This latter potential automatically adjusts itself, in the manner described in preceeding paragraphs, to the value required to keep the system synchronized with the enemy pulse repetition rate.

The position of the interference pulse with respect to the enemy pulse can be varied by adjusting the period of multivibrator 39. The position of the false echo pulse with respect to the interference pulse can be varied by adjusting the period of multivibrator 32. The range over which the latter adjustment can be made can be increased or decreased by increasing or decreasing the period of multivibrator 34.

Although we have shown and described only a certain and specific embodiment of the invention, we are fully aware of the many modifications possible thereof. Therefore, this invention is not to be limited except insofar as is necessitated by the spirit of the prior art and the scope of the claims.

The invention described herein may be manufactured and used by or for the Government of the United States of America for governmental purposes without the payment of any royalties thereon or therefor.

What is claimed is:

1. A device for rendering enemy radio pulse echo location equipment ineffective comprising radio receiver means for receiving said enemy pulses, interference transmitting means, and delay pulser means connected between said receiving means and said transmitting means and triggered by said received pulses to pulse operate said transmitting means a predetermined time after receipt of an enemy pulse so that the transmitted interference pulse overlaps in time the reception of the next succeeding pulse signal from said pulse echo location equipment, said pulser means including control means responsive to changes which may occur in the repetition rate of said received pulses to automatically readjust said predetermined time.

2. A device for rendering enemy radio pulse echo location equipment ineffective comprising radio receiver means for receiving said enemy radio pulses, transmitting means, and delay pulser means connected between said receiving means and said transmitting means and triggered by said received pulses to pulse operate said transmitting means at predetermined intervals after the receipt of an enemy pulse, said pulse operation providing a false echo pulse signal and an interference pulse, said interference pulse overlapping in time the reception of the next succeeding pulse signal from said pulse echo location equipment, said pulser means including control means responsive to changes which may occur in the repetition rate of said received pulses to automatically readjust said predetermined intervals.

3. Apparatus for receiving periodic pulses and transmitting interference periodic pulses in response to said received pulses comprising, pulse actuated transmitting means for transmitting an interference signal, pulse delay means responsive to said received pulses to pulse operate said transmitting means after a predetermined delay such that each interference pulse occupies the interval in which the next succeeding received pulse occurs, said pulse delay means consisting of a plurality of pulse actuated pulse generators connected in series, each pulse generator yielding a single output pulse for each time actuated, the first pulse generator in said series arranged to be actuated by a first of said received pulses, each of the remainder of said pulse generators arranged to be actuated by the trailing edge of the output pulse from the next preceding pulse generator in said series, synchronizing means for adjusting the period of at least one of said pulse generators to a value such that the trailing edge of the pulse from the last of said pulse generators substantially coincides with the next received pulse following said first received pulse, said synchronizing means including a mixing network connected so as to combine the outputs of said pulse generators, said mixing network having a steady direct current output when the repetition rate of transmitted pulses is equal to the repetition rate of received pulses and error current pulses superposed on said steady direct current output when said repetitions rates are not equal, capacitor means arranged to integrate said current pulses as an accumulated charge, said capacitor means further arranged to retain said charge, and amplifier means responsive to the resultant voltage across said capacitor means to adjust the period of at least one of said pulse generators.

4. Apparatus for receiving periodic pulses and transmitting interference periodic pulses in response to said received periodic pulses comprising, interference transmitting means for generating an interference signal, pulse delay means responsive to received periodic pulses to pulse operate said interference transmitting means, each said received periodic pulse actuating a transmitted interference periodic pulse after a predetermined delay such that each transmitted interference periodic pulse occupies the interval in which the next succeeding received periodic pulse occurs, said pulse delay means comprising multivibrator means to provide said predetermined delay, and means responsive to the time delay between said received periodic pulses for maintaining the synchronization of said transmitted periodic pulses and received periodic pulses when changes in the repetition rate of said received periodic pulses occur, said last named means comprising means generating error current pulses when said repetition rate changes, capacitor means integrating said error pulses as total charge, said capacitor means being arranged to retain its charge, and means responsive to the voltage across said capacitor means for controlling said multivibrator means to automatically readjust said predetermined delay whenever the repetition rate of said received periodic pulses changes.

5. An electrical system for synchronizing transmitted pulses with received pulses comprising, receiver means for detecting said received pulses, adjustable timing means connected to said receiver for initiating a timing pulse of variable width in response to each of said received pulses, control means connected to said timing means for comparing the period between the initiation of two successive pulses of said timing pulses and adjusting the timing means such that the width of the later of said two timing pulses plus a fixed time delay period is equal to said period between said successive timing pulses, a pulse operated transmitter, and means connected to said timing means and said transmitter for pulsing said transmitter after a fixed time period commencing with the termination of each of said timing pulses.

* * * * *